(12) United States Patent
Lim et al.

(10) Patent No.: US 12,235,406 B2
(45) Date of Patent: Feb. 25, 2025

(54) MULTI-OPTICAL AXIS SENSOR

(71) Applicant: AUTONICS CORPORATION, Busan (KR)

(72) Inventors: Jae Jeong Lim, Bucheon-si (KR); Hyun Seung Lee, Incheon (KR); Seong Chan Kim, Incheon (KR)

(73) Assignee: AUTONICS CORPORATION, Busan (KR)

( * ) Notice: Subject to any disclaimer, the term of this patent is extended or adjusted under 35 U.S.C. 154(b) by 272 days.

(21) Appl. No.: 17/802,625

(22) PCT Filed: Dec. 8, 2020

(86) PCT No.: PCT/KR2020/017890
§ 371 (c)(1),
(2) Date: Aug. 26, 2022

(87) PCT Pub. No.: WO2021/177557
PCT Pub. Date: Sep. 10, 2021

(65) Prior Publication Data
US 2023/0106717 A1    Apr. 6, 2023

(30) Foreign Application Priority Data
Mar. 3, 2020    (KR) .................. 10-2020-0026480

(51) Int. Cl.
*G01V 8/20*        (2006.01)
*F16P 3/14*        (2006.01)
(Continued)

(52) U.S. Cl.
CPC ............... *G01V 8/20* (2013.01); *F16P 3/144* (2013.01); *F21K 9/272* (2016.08); *F21K 9/61* (2016.08);
(Continued)

(58) Field of Classification Search
CPC . G01V 8/20; F16P 3/144; F21K 9/272; F21K 9/61; G01J 1/0271; G01J 1/04; G01J 1/0437; G01J 1/58
See application file for complete search history.

(56) References Cited

U.S. PATENT DOCUMENTS 6,414,603 B1 *   7/2002   Yamaguchi ............. F16P 3/144
                                                                250/221
7,485,841 B2     2/2009   Inoue et al.
(Continued)

FOREIGN PATENT DOCUMENTS

JP    2003-317585 A    11/2003
JP    2007-104041 A     4/2007
(Continued)

OTHER PUBLICATIONS

English machine translation of JP-2009272064-A (Year: 2009).*

*Primary Examiner* — Dominic J Bologna
(74) *Attorney, Agent, or Firm* — Birch, Stewart, Kolasch & Birch, LLP

(57) ABSTRACT

A multi-optical axis sensor according to an embodiment of the present invention comprises: a light-transmitting unit comprising a plurality of light-transmitting elements; a light-receiving unit comprising a plurality of light-receiving elements which are arranged to respectively face the light-transmitting elements and respectively receive light from the light-transmitting elements; and an indicator light indicating a light incidence state or a light blockage state of the light-receiving unit, wherein, before a muting state that invalidates the detection function of the multi-optical axis sensor is detected, the light-transmitting unit or the light-receiving unit may operate the indicator light in a light incidence/blockage mode indicating the light incidence state or the light blockage state, and when the muting state is detected, the light-transmitting unit or the light-receiving (Continued)

unit may switch the operation mode of the indicator light from the light incidence/blockage mode to the muting mode indicating the muting state.

16 Claims, 15 Drawing Sheets

(51) Int. Cl.
*F21K 9/272* (2016.01)
*F21K 9/61* (2016.01)
*G01J 1/02* (2006.01)
*G01J 1/04* (2006.01)
*G01J 1/58* (2006.01)

(52) U.S. Cl.
CPC ............... *G01J 1/0271* (2013.01); *G01J 1/04* (2013.01); *G01J 1/0437* (2013.01); *G01J 1/58* (2013.01)

(56) References Cited

U.S. PATENT DOCUMENTS

| | | | |
|---|---|---|---|
| 9,618,650 | B2 | 4/2017 | Kikuchi et al. |
| 2013/0270423 | A1* | 10/2013 | Kawabata ................ G01V 8/20 250/208.2 |
| 2015/0108376 | A1 | 4/2015 | Kawaguchi |
| 2015/0301221 | A1* | 10/2015 | Kikuchi .................. G01V 8/20 250/208.2 |
| 2017/0228991 | A1 | 8/2017 | Gelineau et al. |
| 2018/0017434 | A1 | 1/2018 | Fukumoto et al. |
| 2018/0088251 | A1 | 3/2018 | Tobe et al. |

FOREIGN PATENT DOCUMENTS

| | | | |
|---|---|---|---|
| JP | 2008-181721 A | | 8/2008 |
| JP | 2008-181788 A | | 8/2008 |
| JP | 2009272064 A | * | 11/2009 |
| JP | 2015-78946 A | | 4/2015 |
| KR | 10-1630117 B1 | | 6/2016 |
| KR | 10-2018-0007667 A | | 1/2018 |

* cited by examiner

FIG. 2B
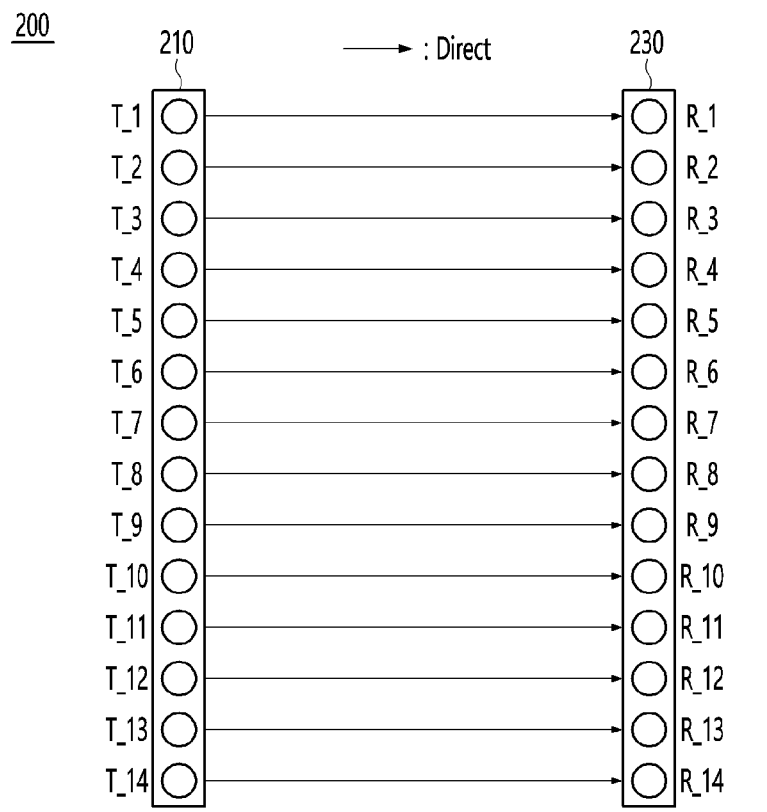
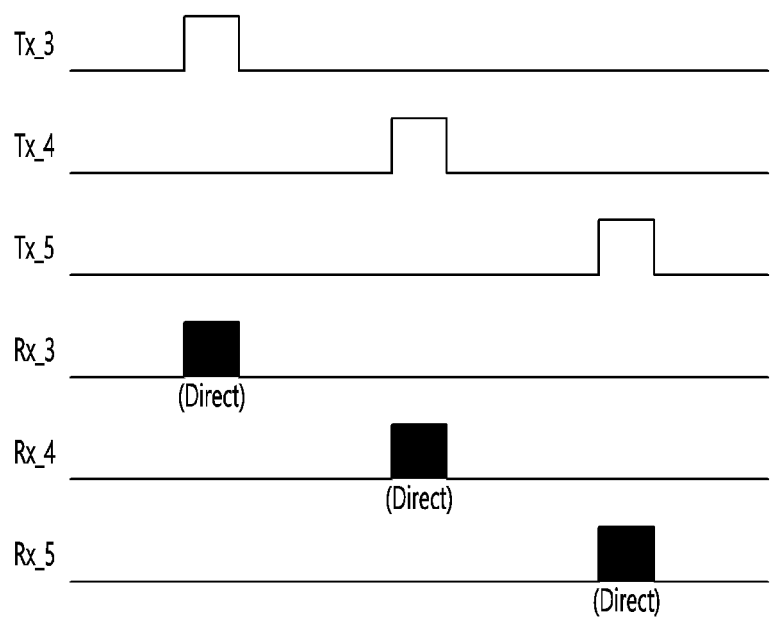

L(m) : LENGTH OF WORKPIECE
V(m/s) : VELOCITY OF WORKPIECE
D(M) : DISTANCE BETWEEN POINTS AT WHICH EACH MUTING
MUTING SENSOR FIRST DETECTS WORKPIECE

FIG. 10

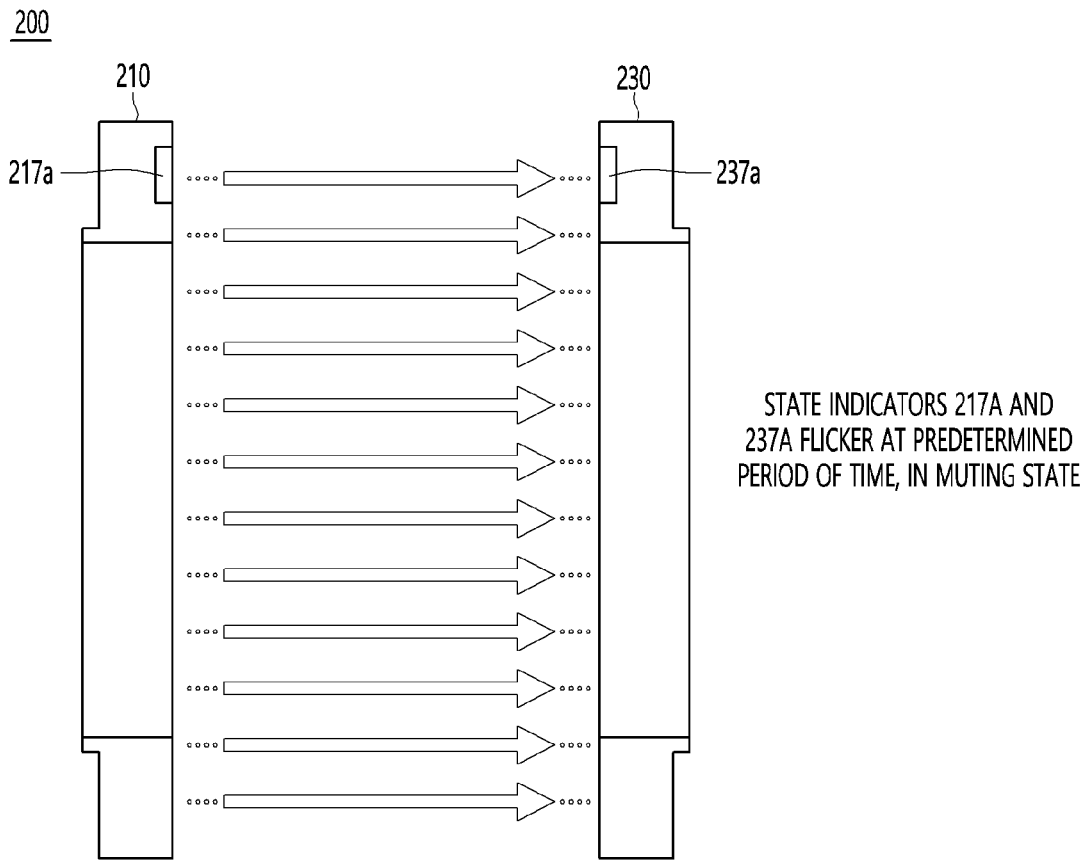

STATE INDICATORS 217A AND 237A FLICKER AT PREDETERMINED PERIOD OF TIME, IN MUTING STATE

FIG. 11

| | BEFORE MUTING STATE IS DETECTED | AFTER MUTING STATE IS DETECTED |
|---|---|---|
| PRIOR ART | 1. LIGHT INCIDENCE-STATE INDICATOR EMITS GREEN LIGHT (CONTROL OUTPUT ON) 2. LIGHT BLOCKAGE-STATE INDICATOR EMITS RED LIGHT (CONTROL OUTPUT OFF) | 1. LIGHT INCIDENCE-STATE INDICATOR EMITS GREEN LIGHT (CONTROL OUTPUT ON) 2. LIGHT BLOCKAGE-STATE INDICATOR EMITS RED LIGHT (CONTROL OUTPUT OFF) 3. EXTERNAL INDICATOR FLICKERS |
| PRESENT DISCLOSURE | 1. LIGHT INCIDENCE-STATE INDICATOR EMITS GREEN LIGHT (CONTROL OUTPUT ON) 2. LIGHT BLOCKAGE-STATE INDICATOR EMITS RED LIGHT (CONTROL OUTPUT OFF) | STATE INDICATOR FLICKERS GREEN |

MULTI-OPTICAL AXIS SENSOR

CROSS REFERENCE TO RELATED APPLICATIONS

This application is the National Phase of PCT/KR2020/017890 filed on Dec. 8, 2020, which claims priority under 35 U.S.C. § 119 (a) to Patent Application No. 10-2020-0026480 filed in the Republic of Korea on Mar. 3, 2020, all of which are hereby expressly incorporated by reference into the present application.

TECHNICAL FIELD

The present disclosure relates to a multi-optical axis sensor device, and, more particularly, to a multi-optical axis sensor device capable of recognizing a muting state.

BACKGROUND ART

A multi-optical axis sensor may receive light emitted from a light transmitter through a light receiver and detect a workpiece using the received light.

A general multi-optical axis sensor includes a light transmitter in which a plurality of light transmission elements is arranged in a line and a light receiver in which light reception elements equal in number to the number of light transmission elements are arranged in a line. The light transmission elements and the light reception elements are disposed to face each other in one-to-one correspondence and a detection region is set by a plurality of optical axes.

In the light transmitter, the light transmission elements sequentially emit light. In the light receiver, at timing synchronized with the light emission operation of the light transmission elements, the amount of light received by the light reception elements is extracted from the light reception elements corresponding to the light transmission elements. Accordingly, the light blockage state of each optical axis of the multi-optical axis sensor is sequentially detected. The light receiver determines whether there is a workpiece in the detection region using the result of detection of each optical axis and outputs a signal indicating the result of determination.

The multi-optical axis sensor is installed as a device for safety of workers in a production site. For example, when a light blockage state is detected at the optical axis of any one side of the detection region of the multi-optical axis sensor, operation of the production equipment is stopped for safety.

A muting function temporarily invalidates a safety function and maintains control output in an ON state even if there is a workpiece in the detection region (or the safety region). The muting function may be used in an environment (e.g., a conveyor transfer line) in which a workpiece (detected object) frequently passes through the detection region.

However, conventionally, in order to display the muting state, it was necessary to additionally provide a lamp and a wiring in the multi-optical axis sensor. In addition, due to spatial limitation for installation of the lamp and wiring, a user has no choice but to recognize the muting state in a limited way.

In addition, when the lamp indicating the muting state is installed at a wrong position, the user cannot recognize a series of processes of entering and maintaining the muting state. Therefore, there is a problem that it is easy to make an error in using the muting function.

As a related patent document, there is Korean Patent Registration No. 0564043.

[Invention]

Technical Problem

An object of the present disclosure is to recognize a muting state without a separate external indicator indicating a muting state.

An object of the present disclosure is to make it possible to easily recognize the muting state outside using an existing state indicator.

Technical Solution

A multi-optical axis sensor according to an embodiment of the present disclosure comprises a light transmitter including a plurality of light transmission elements, and a light receiver including a plurality of light reception elements disposed to respectively face the plurality of light transmission elements and configured to receive light, wherein the light transmitter and the light receiver includes a plurality of light sources indicating a state of the multi-optical axis sensor. The light transmitter or the light receiver may operate the plurality of light sources in a light incidence/blockage mode indicating a light incidence state or a light blockage state, before detecting a muting state in which a safety function of the multi-optical axis sensor is invalidated, and switch the operation mode of the plurality of light sources from the light incidence/blockage mode to a muting mode indicating the muting state, when the muting state is detected.

Effect of the Invention

According to an embodiment of the present disclosure, by displaying a muting state through a state indicator integrally installed on an upper end of a multi-optical axis sensor, a user can easily visually recognize whether the muting state has started and continued.

In addition, according to an embodiment of the present disclosure, since a separate lamp and wiring for displaying a muting state are unnecessary, there is no space restriction and cost may be reduced.

DESCRIPTION OF DRAWINGS

FIG. 2b is a view illustrating a driving method of a multi-optical axis sensor according to a first embodiment of the present disclosure.

FIG. 10 is a view illustrating an example of using an existing state indicator to indicate a muting state according to an embodiment of the present disclosure.

FIG. 11 is a table for comparing the prior art and the present disclosure for handling before and after detection of the muting state.

BEST MODE

Hereinafter, embodiments relating to the present disclosure will be described in detail with reference to the accompanying drawings. The suffixes "module" and "interface" for components used in the description below are assigned or mixed in consideration of easiness in writing the specification and do not have distinctive meanings or roles by themselves.

Figure 1:
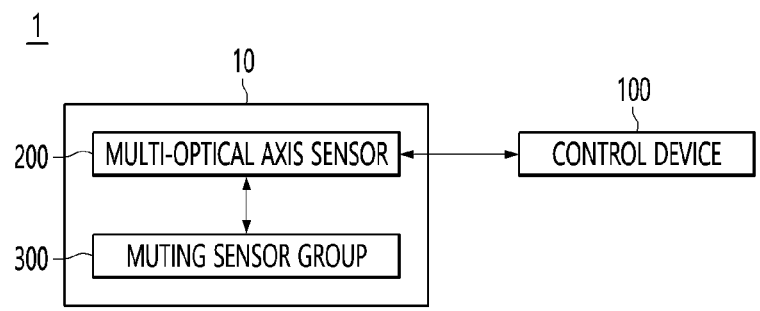
FIG. 1 is a view illustrating a configuration of a sensor system according to an embodiment of the present disclosure.

FIG. 1 is a view illustrating a configuration of a sensor system according to an embodiment of the present disclosure.

A safety system 1 according to an embodiment of the present disclosure may include a control device 100, a multi-optical axis sensor 200 and a muting sensor group 300.

The control device 100, the multi-optical axis sensor 200 and the muting sensor group 300 may be connected by wire to perform communication.

The control device 100 may control operation of the multi-optical axis sensor 200.

The control device 100 may transmit a setting input signal for setting the multi-optical axis sensor 200 and a control signal for operation control.

The multi-optical axis sensor 200 is a device installed for safety of workers in a production site and may detect a light incidence state or a light blockage state.

The muting sensor group 300 may include a plurality of muting sensors.

The muting sensor may be any one of a transmission type muting sensor or a mirror reflection type muting sensor.

The transmission type muting sensor may include a light transmission unit and a light reception unit. The light transmission unit may transmit light, and the light reception unit may receive light from the light transmission unit.

The transmission type muting sensor may determine whether a workpiece is detected depending on whether the light reception unit receives light transmitted by the light transmission unit.

The mirror reflection type muting sensor may be paired with one reflector.

The mirror reflection type muting sensor may transmit an optical signal or a radio signal and detect a workpiece using a reflected signal reflected through a reflector.

The arrangement position of the plurality of muting sensors may vary according to the type of the muting mode described later.

Figure 2A:
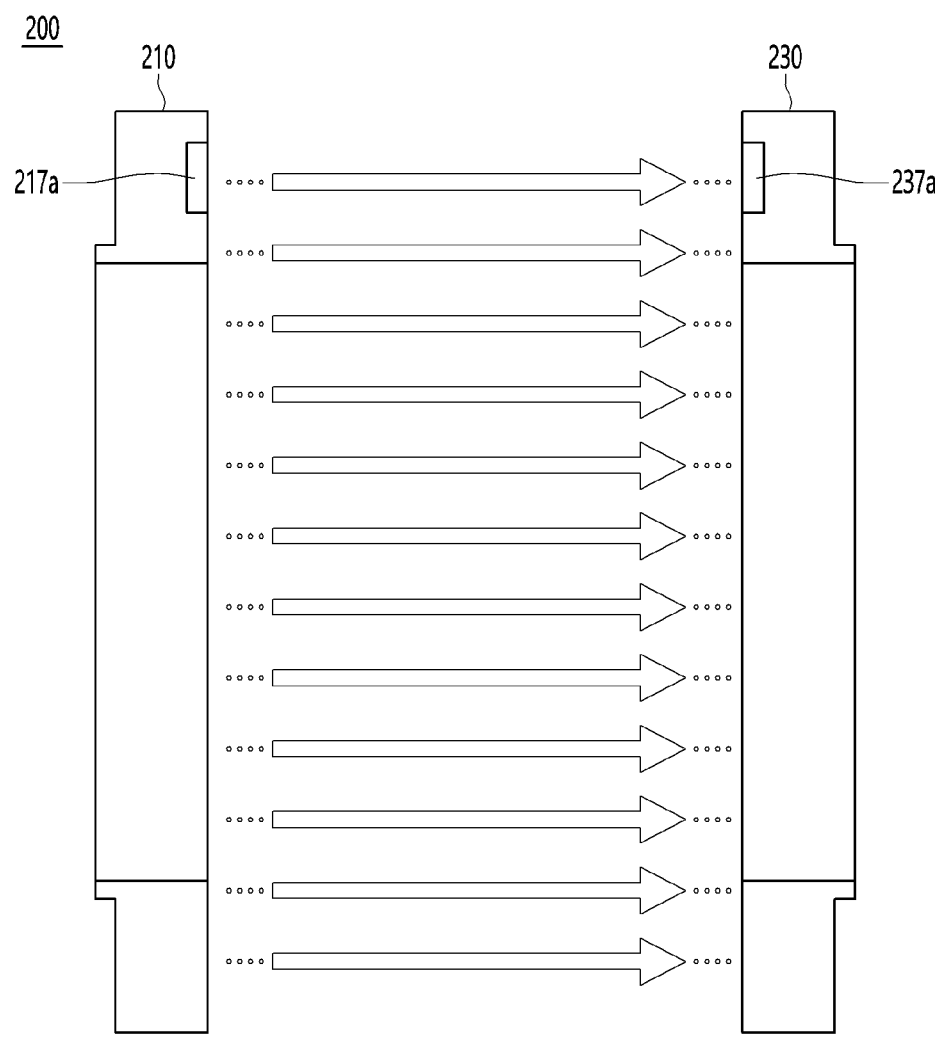
FIG. 2a illustrates an actual configuration of a multi-optical axis sensor according to an embodiment of the present disclosure.

FIG. 2a illustrates an actual configuration of a multi-optical axis sensor according to an embodiment of the present disclosure, and FIG. 2b is a view illustrating a driving method of a multi-optical axis sensor according to an embodiment of the present disclosure.

Referring to FIG. 2a, the multi-optical axis sensor 200 may include a light transmitter 210 and a light receiver 230.

Light transmitted from the light transmitter 210 may be received through the light receiver 230.

In the light transmitter 210, the light elements sequentially emit light. In the light receiver 230, at timing synchronized with the light emission operation of the light transmission elements, the amount of light received by the light reception elements is obtained from the light reception elements corresponding to the light transmission elements.

Accordingly, the light blockage state of each optical axis of the multi-optical axis sensor 200 may be sequentially detected. The light receiver 230 may determine whether there is a workpiece in the detection region using the result of detection of each optical axis and output a signal indicating the result of determination.

Referring to FIG. 2b, the multi-optical axis sensor 200 is shown.

The multi-optical axis sensor 200 may include the light transmitter 210 and the light receiver 230.

The light transmitter 210 may include a plurality of light transmission elements T_1 to T_14.

The light receiver 210-230 may include a plurality of light reception elements R_1 to R_14.

The plurality of light reception elements R_1 to R_14 may be disposed to face the plurality of light transmission elements T_1 to T_14.

The plurality of light transmission elements T_1 to T_14 may correspond to the plurality of light reception elements R_1 to R_14, respectively.

The plurality of light transmission elements T_1 to T_14 may sequentially operate. In correspondence therewith, the plurality of light reception elements R_1 to R_14 may sequentially operate.

For example, when the third light transmission element T_3 emits single light, the third light reception element R_3 corresponding to the third light transmission element T_3 may receive the single light.

That is, when any one light transmission element emits single light, only the light reception element corresponding thereto may be turned on to receive single light.

This may be confirmed through the driving waveform of FIG. 2b.

Figure 3:
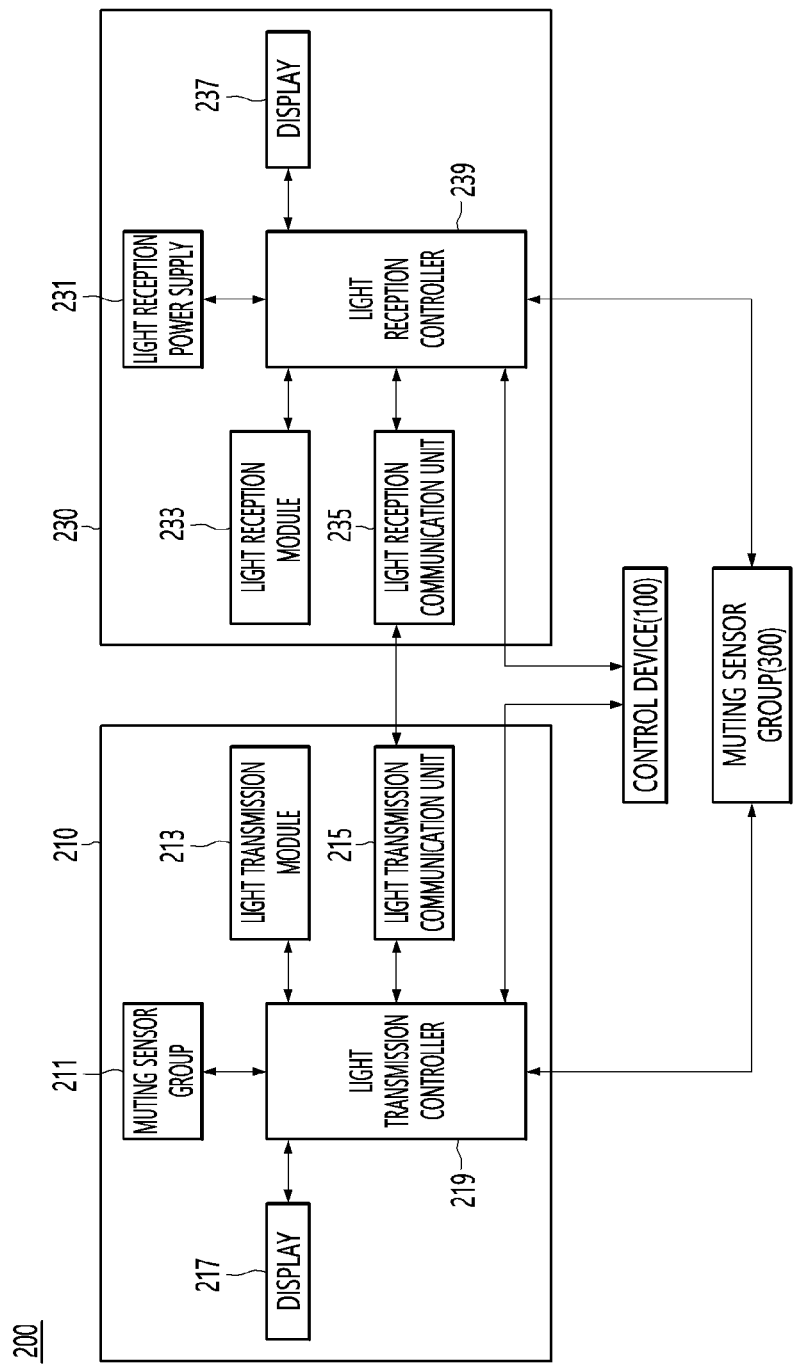
FIG. 3 is a block diagram illustrating a configuration of a multi-optical axis sensor according to an embodiment of the present disclosure.

FIG. 3 is a block diagram illustrating a configuration of a multi-optical axis sensor according to an embodiment of the present disclosure.

Referring to FIG. 3, the multi-optical axis sensor 200 according to the embodiment of the present disclosure may include the light transmitter 210 and the light receiver 230.

The light transmitter 210 includes a light transmission power supply 211, a light transmission module 213, a light transmission communication unit 215, a display 217 and a light transmission controller 219.

The light transmission power supply 211 may supply power to components of the light transmitter 210. The light transmission power supply 211 may receive DC power from an external input power source and transmit it to the components of the light transmitter 210.

The light transmission module 213 may include a plurality of light transmission elements for emitting light.

The light transmission communication unit 215 may perform communication with a light reception communication unit 235 provided in the light receiver 230 by wire.

The light transmission communication unit 215 may exchange data with the light reception communication unit 235 through one-way asynchronous communication.

The light transmission communication unit 215 and the light reception communication unit 235 may exchange data through a serial communication standard.

The display 217 may include at least one light emitting diode (LED).

The display 217 may include a plurality of color LEDs indicating a light incidence state or a light blockage state.

The light transmission controller 219 may control overall operation of the light transmitter 210.

The light transmission controller 219 may output one or more of an alarm or a self-diagnosis signal according to the level of the amount of received light based on light reception state information received from the light receiver 230.

The light receiver 230 includes a light reception power supply 231, a light reception module 233, a light reception communication unit 235, a display 237 and a light reception controller 239.

The light reception power supply 231 may supply power to components of the light receiver 230. The light reception power supply 231 may receive DC power from an external input power source and transmit it to the components of the light receiver 230.

The light reception module 233 may include a plurality of light reception elements capable of receiving light emitted from the light transmission element.

The light reception communication unit 235 may perform communication with the light transmission communication unit 215 provided in the light transmitter 210 by wire.

The display 237 may include at least one light emitting diode (LED).

The display 237 may include a plurality of color LEDs indicating a light incidence state or a light blockage state.

The light reception controller 239 may control overall operation of the light receiver 230.

The amount of light received by the light reception module 233 from the light transmitter 210 may be confirmed.

The control device 100 may be installed separately from the multi-optical axis sensor 200.

The control device 100 may transmit a setting input signal to the light receiver 230 through an input line connected to the light transmitter 210.

The control device 100 may receive a self-diagnosis signal from the light transmitter 210 or the light receiver 230 through an output line connected to the light transmitter 210 or the light receiver 230.

The manager of the control device 100 may check the light reception state of the light receiver 230 through the self-diagnosis signal received from the control device 100.

The control device 100 may receive a control signal from the light receiver 230. The control signal may indicate the light incidence state or light blockage state of the light receiver 230. For example, the light receiver 230 may output and transmit an off signal to the control device 100 in the light incidence state and output and transmit an on signal to the control device 100 in the light blockage state.

Figure 4:
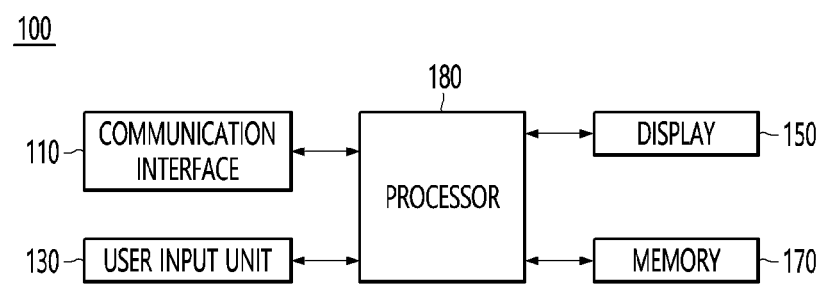
FIG. 4 is a block diagram illustrating a configuration of a control device according to an embodiment of the present disclosure.

FIG. 4 is a block diagram illustrating a configuration of a control device according to an embodiment of the present disclosure.

The control device 100 may be implemented by a fixed device or a mobile device, such as a TV, a projector, a mobile phone, a smartphone, a laptop, a personal digital assistants (PDA), a portable multimedia player (PMP), a tablet PC, a wearable device, a computer, etc.

Referring to FIG. 4, the control device 100 may include a communication interface 110, a user input unit 130, a display 150, a memory 170 and a processor 180.

The communication interface 110 may transmit and receive data to and from an external device such as the multi-optical axis sensor 200, an external server, etc. using wired/wireless communication technology.

The communication interface 110 may transmit and receive sensing information, user input, a control signal, etc. to and from an external device.

Communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), Serial communication, etc.

The user input unit 130 receives information from a user, and the processor 180 may control operation of the control device 100 to correspond to input information when information is input through the user input unit 130.

The user input unit 130 may include a mechanical input unit (or a mechanical key, e.g., a button, a dome switch, a jog wheel, a jog switch, etc. located on a front/rear surface or side surface of the control device 100) and a touch input unit.

When the control device 100 is a PC, the mechanical input unit may be a mouse and a keyboard.

The display 150 displays (outputs) information processed by the control device 100. For example, the display 150 may display execution screen information of an application program driven in the control device 100 or UI (User Interface), GUI (Graphic User Interface) information according the execution screen information.

The display 150 may implement a touchscreen, by forming an mutual layer structure or being formed integrally with a touch sensor. Such a touchscreen may function as the user input unit 120 for providing an input interface between the control device 100 and the user and provide an output interface between the control device 100 and the user.

The memory 170 may store data supporting various functions of the control device 100. The memory 170 may store an application or application program for setting a safety related function of the multi-optical axis sensor 200.

The processor 180 may control operation of components of the control device 100.

The processor 180 may process signals, data, information, etc. input or output through the above-described components or driving the application program stored in the memory 170, thereby providing or processing proper information or functions to the user.

Figure 5:
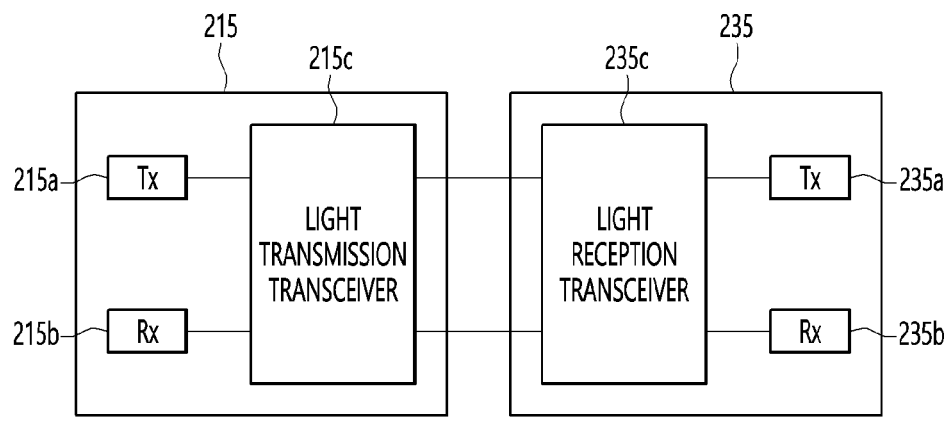
FIG. 5 is a view illustrating a detailed configuration of the light transmission communication unit and the light reception communication unit described in FIG. 3.

FIG. 5 is a view illustrating a detailed configuration of the light transmission communication unit and the light reception communication unit described in FIG. 3.

Referring to FIG. 5, the light transmission communication unit 215 may include a first data transmitter 215a, a first data receiver 215b and a first transceiver 215c.

The light reception communication unit 235 may include a second data transmitter 235a, a second data receiver 235b and a second transceiver 235c.

The first transceiver 215c and the second transceiver 235c may perform serial communication.

Figure 6:
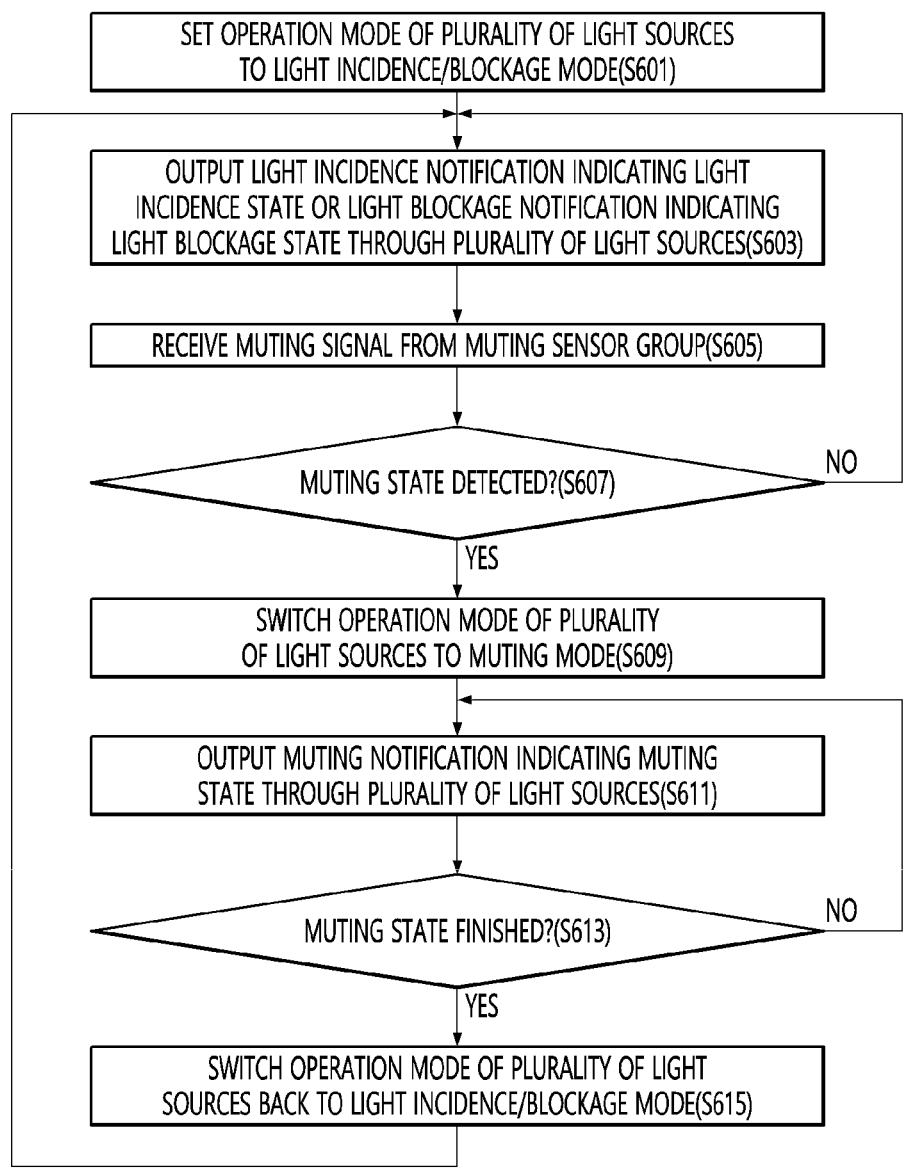
FIG. 6 is a flowchart illustrating a method of operating a multi-optical axis sensor according to an embodiment of the present disclosure.

FIG. 6 is a flowchart illustrating a method of operating a multi-optical axis sensor according to an embodiment of the present disclosure.

In the embodiment of FIG. 6, the described steps may be performed by the light transmitter 210 or the light receiver 230 of the multi-optical axis sensor 200. Specifically, in the embodiment of FIG. 6, the described steps may be performed by the light transmission controller 219 of the light transmitter 210 or the light reception controller 239 of the light receiver 230.

The multi-optical axis sensor 200 sets an operation mode of a plurality of light sources to a light incidence/blockage mode in a state in which the muting function is activated (S601).

The plurality of light sources may be provided on a main substrate of the light transmitter 210 or the light receiver 230.

Each of the plurality of light sources may be an LED for emitting a specific color.

The operation mode of the plurality of light sources may include a light incidence/blockage mode and a muting mode.

The light incidence/blockage mode may be a mode for identifying the light incidence state or light blockage state of the multi-optical axis sensor 200.

The muting mode may be a mode for identifying whether the multi-optical axis sensor 200 is in a muting state. The muting mode may be a mode in which the muting function of the multi-optical axis sensor 200 is activated.

The operation mode of the plurality of light sources may vary according to the muting state of the multi-optical axis sensor 200.

The multi-optical axis sensor 200 outputs a light incidence notification indicating a light incidence state or a light blockage notification indicating a light blockage state through the plurality of light sources in the light incidence/blockage mode (S603).

The multi-optical axis sensor 200 may output the light incidence notification indicating that the multi-optical axis sensor 200 is in the light incidence state through the plurality of light sources, in the light incidence state.

The light incidence notification may be a notification outputting a first color during the light incidence state. The first color may be green but is only an example.

The multi-optical axis sensor 200 may output the light blockage notification indicating that the multi-optical axis sensor 200 is in the light blockage state through the plurality of light sources, in the light blockage state.

The light blockage notification may be a notification outputting a second color during the light blockage state. The second color may be red but is only an example.

The multi-optical axis sensor 200 receives the muting signal from the muting sensor group 300 (S605).

In an embodiment, each of a plurality of muting sensors include in the muting sensor group 300 may output a muting signal.

The light transmitter 210 or the light receiver 230 of the multi-optical axis sensor 200 may receive the muting signal from each muting sensor.

The muting signal may be any one of a high signal (or an on signal) or a low signal (off signal).

The muting sensor may output an on signal when a workpiece is detected and output an off signal when a workpiece is not detected.

The multi-optical axis sensor 200 determines whether the muting state is detected based on the received muting signal (S607).

The muting state may be a state in which the detection function of the multi-optical axis sensor 200 is temporarily released.

The muting state may be a state in which the muting function of the multi-optical axis sensor 200 is activated.

The multi-optical axis sensor 200 may determine that the muting state is detected, when the muting signals respectively received from the plurality of muting sensors are all on signals.

The multi-optical axis sensor 200 may determine that the muting state is not detected, when any one of the detected signals respectively received from the plurality of muting sensors is an off signal.

The multi-optical axis sensor 200 may activate the muting mode when the muting state is detected.

Based on the muting signal, the multi-optical axis sensor 200 maintains the operation mode of the plurality of light sources in the light incidence/blockage mode when the muting state is not detected, and switches the operation mode of the plurality of light sources to the muting mode when the muting state is detected (S609).

That is, the multi-optical axis sensor 200 may change the operation mode of the plurality of light sources from the light incidence/blockage mode to the muting mode, when the muting state is detected.

The multi-optical axis sensor 200 outputs a muting notification indicating the muting state through the plurality of light sources, in the muting mode (S611).

In an embodiment, the muting alarm is an alarm in which a specific color flickers through a plurality of light sources at a predetermined time period during the muting state. For example, the muting alarm may be a notification in which a green color flickers at a time period of 1 second through the plurality of light sources.

The detection process of the muting state will be described with reference to FIGS. 7*a* to 7*c*.

Figure 7A:
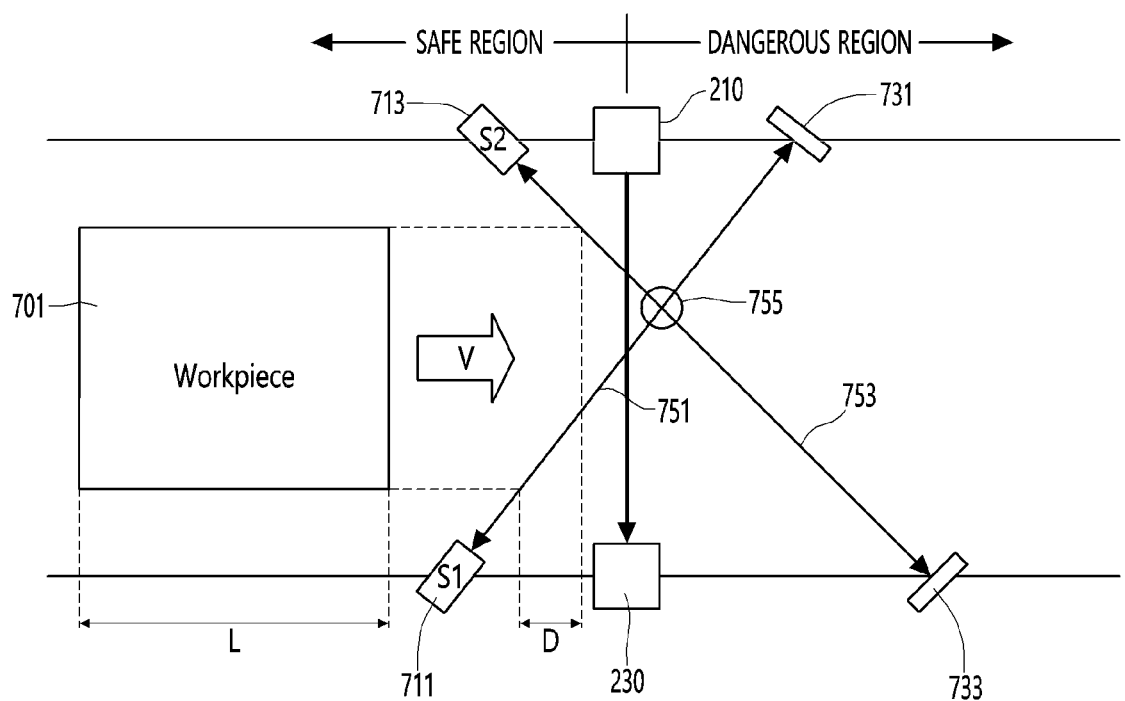
FIGS. 7a to 7c are views illustrating a process of detecting a muting state by a multi-optical axis sensor according to an embodiment of the present disclosure.
Figure 7B:
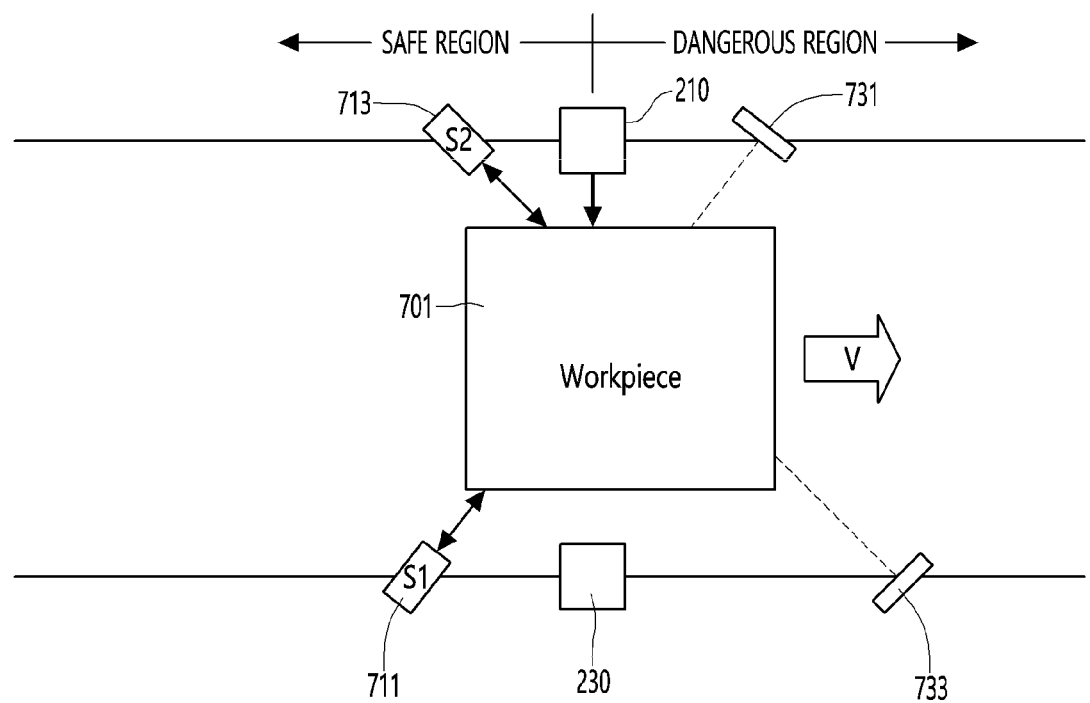
Figure 7C:
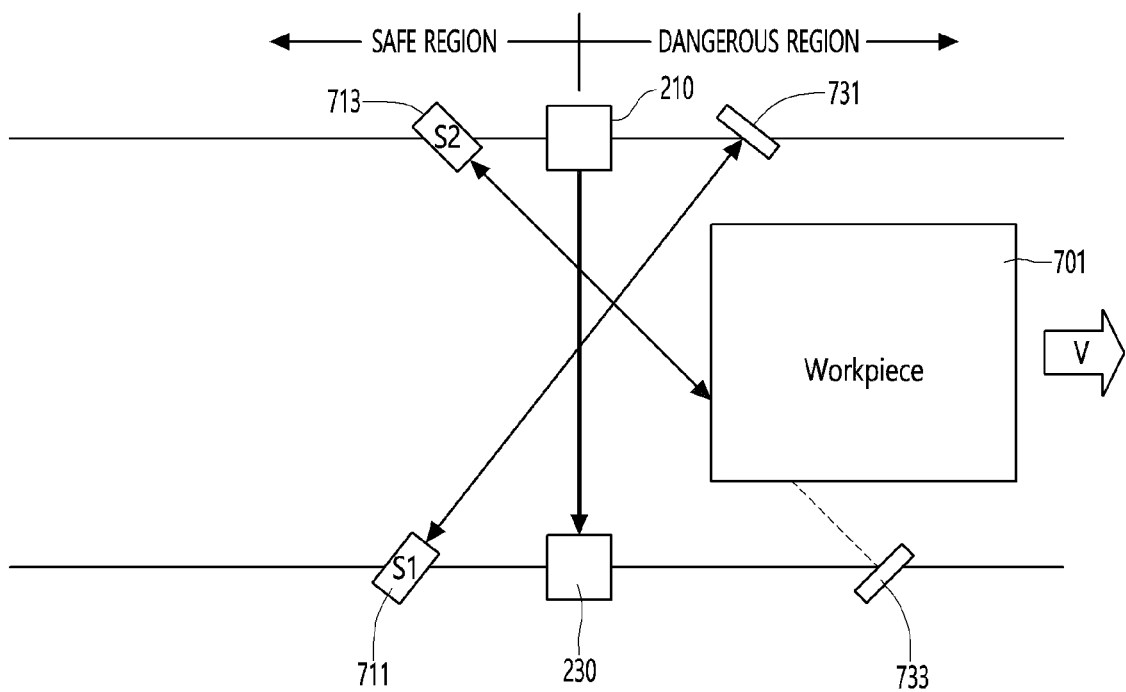

FIGS. 7*a* to 7*c* are views illustrating a process of detecting the muting state by the multi-optical axis sensor according to an embodiment of the present disclosure.

In FIGS. 7*a* to 7*c*, it is assumed that the muting mode is set to a standard mode and two muting sensors 711 and 731 are used.

The muting mode may include a standard mode or an exit mode.

The standard mode may be a mode which may be used in an environment (e.g., a conveyor transfer line) in which a workpiece frequently passes through the detection region and may be a mode in which the safety function of the multi-optical axis sensor 200 is temporarily released in the muting state.

The exit mode may be a mode in which the muting state is maintained for a predetermined time after mute inputs are finished. The exit mode may be a mode that requires stable operation of the multi-optical axis sensor 200 through complete removal of a workpiece.

It is assumed that the length of a workpiece 701 is L(m), and the movement velocity of the workpiece 701 is V(m/s).

In addition, it is assumed that a distance between points at which the first muting sensor 711 and the second muting sensor 713 start to detect the workpiece 701 is D(m).

The light transmitter 210 and the light receiver 230 may be disposed to face each other at a predetermined distance.

When the muting mode of the multi-optical axis sensor 200 is a standard mode, a region before the workpiece 701 passes through the multi-optical axis sensor 200 may be called a safety region and a region after the workpiece passes through the multi-optical axis sensor 200 may be called a dangerous region.

Each of the first muting sensor 711 and the second muting sensor 713 may be located in a safety region. The first muting sensor 711 may be disposed on one side of the light receiver 230, and the second muting sensor 713 may be disposed on one side of the light transmitter 210.

In the dangerous region, a first reflector 731 located on one side of the light transmitter 210 and a second reflector 733 located on one side of the light receiver 230 may be disposed.

The first reflector 731 may be disposed to face the first muting sensor 711, and the second reflector 733 may be disposed to face the second muting sensor 713.

The first muting sensor 711 and the first reflector 731 form a pair, and the second muting sensor 713 and the second reflector 733 form a pair.

The first reflector 713 may reflect a signal output from the first muting sensor 711, and the second reflector 733 may reflect a signal output from the second muting sensor 713.

The first muting sensor 711, the second muting sensor 713, the first reflector 731 and the second reflector 733 may be disposed such that an intersection 755 between the first optical axis 751 of the first muting sensor 711 and the second optical axis 753 of the second muting sensor 713 is located in the dangerous region.

Each of the first muting sensor 711 and the second muting sensor 713 may be a sensor for outputting an optical signal and receiving reflected light.

The first muting sensor 711 may output an off signal when a first signal output therefrom is received within a predetermined time through the first reflector 713.

The first muting sensor 711 may output an on signal, when the first signal output therefrom is not received within the predetermined time.

The second muting sensor 713 may output an off signal, when a second signal output therefrom is received within a predetermined time through the second reflector 733.

The second muting sensor 713 may output an on signal when the second signal output therefrom is not received within the predetermined time.

That is, the off signal output from the muting sensor may be a signal indicating that the workpiece 701 is not detected and the on signal may be a signal indicating that the workpiece 701 is detected.

The muting input being detected may be interpreted as having the same meaning as the muting sensor outputting the on signal.

The multi-optical axis sensor 200 or the control device 100 may receive the muting signal output from each muting sensor from each muting sensor.

The multi-optical axis sensor 200 may determine whether the workpiece 701 is detected, based on the muting signal output from the first muting sensor 711 or the second muting sensor 713. The muting signal may be called a muting input signal.

That is, when the muting sensor outputs the off signal, the multi-optical axis sensor 200 may determine that the workpiece 701 is not detected through the muting sensor.

When the muting sensor outputs the on signal, the multi-optical axis sensor 200 may determine that the workpiece 701 is detected through the muting sensor.

Referring to FIG. 7a, before the workpiece 701 passes through the first muting sensor 711, each of the first muting sensor 711 and the second muting sensor 713 may output the off signal.

In this case, the safety function of the multi-optical axis sensor 200 is in a valid state.

If the workpiece 701 further moves to the right, the first muting sensor 711 may output the on signal.

Referring to FIG. 7b, a state in which the workpiece 701 is detected through the first muting sensor 711 and the second muting sensor 713 is shown.

According to movement of the workpiece 701, the first muting sensor 711 and the second muting sensor 713 may sequentially output the on signal.

That is, each of the first muting sensor 711 and the second muting sensor 713 may output the on signal as the muting signal. In this case, the multi-optical axis sensor 200 may determine that the muting state is detected and activate the muting function. As the muting function is activated, the safety function of the multi-optical axis sensor 200 may be invalidated.

Therefore, even if optical axes set to the muting region are in the light blockage state, control output OSSD may be maintained in the on state.

Referring to FIG. 7c, the workpiece 701 passed through the first muting sensor 711, but did not pass through the second muting sensor 713. In this case, the first muting sensor 711 may output the off signal, and the second muting sensor 713 may output the on signal.

When the muting signal output from the first muting sensor 711 is switched from the on signal to the off signal, the multi-optical axis sensor 200 may determine that the muting state is finished.

The multi-optical axis sensor 200 may validate the safety function of the multi-optical axis sensor 200 as the muting state is finished.

Figure 8:
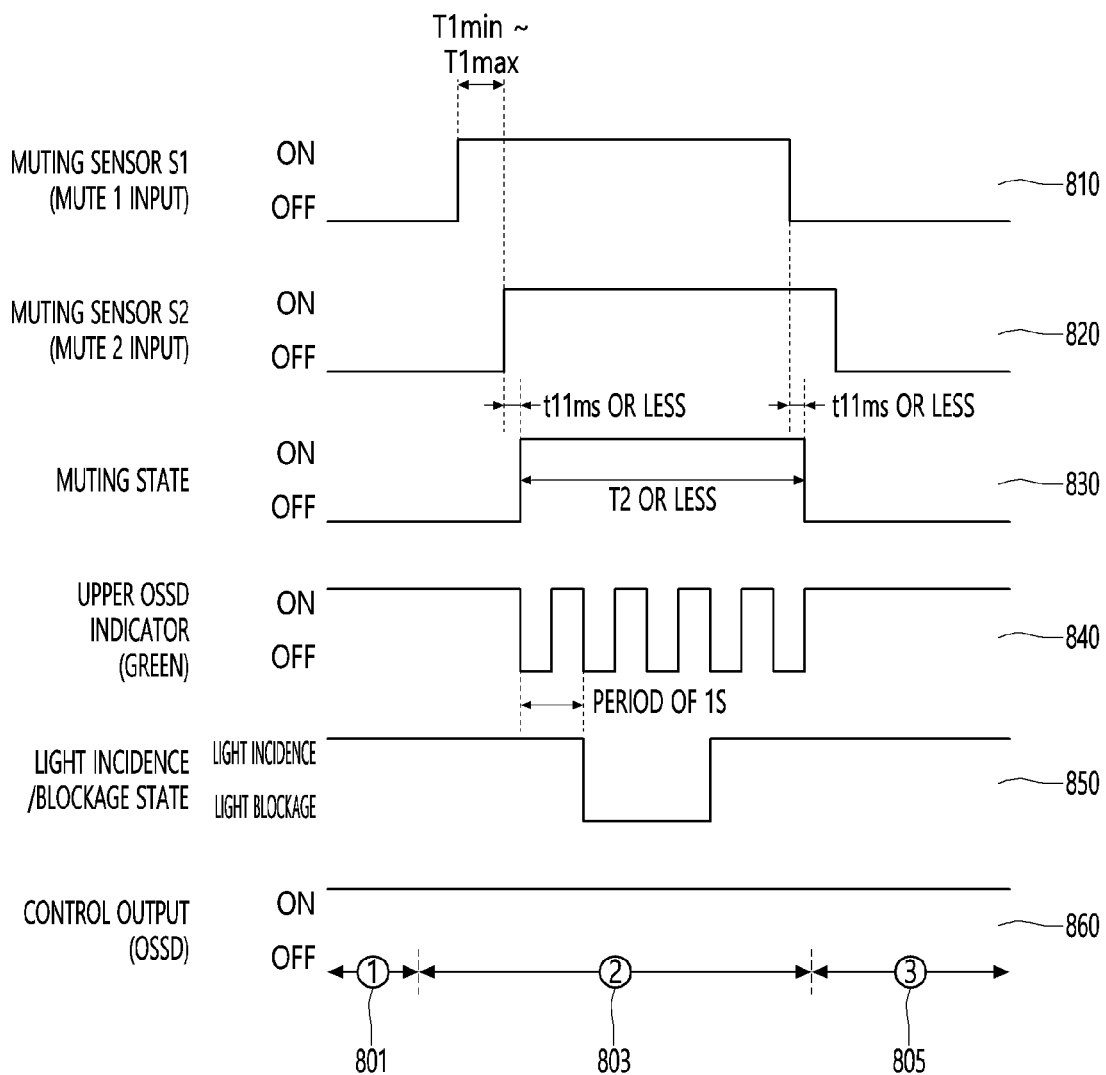
FIG. 8 is a view illustrating timing diagrams of FIGS. 7a to 7c.

FIG. 8 is a view illustrating timing diagrams of FIGS. 7a to 7c.

Referring to FIG. 8, FIG. 7a may correspond to a first section 801, FIG. 7b may correspond to a second section 803, and FIG. 7c may correspond to a third section 805.

A first waveform 810 is the waveform of the muting signal output from the first muting sensor 711.

A second waveform 820 is a waveform of the muting signal output from the second muting sensor 713.

A muting input time limit T1 may represent a time required for the second muting sensor 303 to output the on signal after the first muting sensor 301 outputs the on signal.

A distance D between points at which the first muting sensor 711 and the second muting sensor 713 start to detect the workpiece 701 may be less than the length L of the workpiece 701.

A minimum value T1 min of the muting input time limit T1 may be less than D/V, and a maximum value T1 max of the muting input time limit T1 may be greater than D1/V.

A third waveform 830 is a waveform indicating on or off of the muting state obtained based on the first waveform 810 and the second waveform 820.

The muting state may be on when both the outputs of the first muting sensor 711 and the second muting sensor 713 are on and the muting state may be off when any one of the outputs of the first muting sensor 711 and the first muting sensor 713 is off.

The duration T2 of the muting state may be a time during which both the outputs of the first muting sensor 711 and the second muting sensor 713 are on.

The duration T2 of the muting state may be a time during which both the outputs of the first muting sensor 711 and the first muting sensor 713 are on.

A fourth waveform 840 is a waveform indicating the display period of light output from one or more of an upper state indicator 217a of the light transmitter 210 and a state indicator 237a disposed above the light receiver 230. The display period may be 1 second, but is only an example.

One or more of the state indicator 217a disposed above the light transmitter 210 and the state indicator 237a disposed above the light receiver 230 flickers light having a specific color at a predetermined time period during the duration T2 of the muting state. The specific color is green and the predetermined time may be 1 second, but is only an example.

A fifth waveform 850 is a waveform indicating the light incidence and blockage state of the multi-optical axis sensor 200.

A sixth waveform 860 is a waveform of an output signal (control output) of an output signal switching device (OSSD) included in the multi-optical axis sensor 200.

The muting state may be activated or initiated when the following conditions are satisfied in the standard mode.
(1) There is no light blockage workpiece in the detection region and the control output is on (however, when the muting region and the blanking region overlap, the muting state may be initiated only when the light blockage workpiece is present in the blanking region)
(2) After a first on signal output from the first muting sensor 711 is input, a second on signal output from the second muting sensor 713 is sequentially input, and the second on signal is input when the muting input time limit is between T1 min to T1 max after the first on signal is input.
(3) Not locked out.
(4) A LAMP output monitoring result is a normal state (However, when LAMP output mode is muting setting).

The muting state may be deactivated or finished when any one of the following conditions is satisfied, in the standard mode.
(1) One of the first muting signal output from the first muting sensor 711 and the second muting signal output from the second muting sensor 713 is maintained in the OFF state for an allowed stop time (0.1 s) or more.
(2) During the muting state, muting input stop is detected more than 5 times within the allowed stop time (0.1 s) (muting input stop is when a chattering signal is detected).
(3) After the muting state starts, a maximum holding time T2 of the muting state is exceeded.
(4) The optical axis outside the muting region is blocked.
(5) It enters the lockout state.
(6) The LAMP output monitoring result is not normal (However, when the LAMP output mode is muting setting)

FIG. 6 will be described.

Meanwhile, when detecting that the muting state is finished based on the muting signal (S613), the multi-optical axis sensor 200 may switch the operation mode of the plurality of light sources of the multi-optical axis sensor 200 from the muting mode back to the light incidence/blockage mode (S615).

That is, the multi-optical axis sensor 200 may control the plurality of light sources to output a notification indicating a light incidence/blockage state or a light blockage state when the muting state is finished.

As described above, according to the embodiment of the present disclosure, the state indicators 217a and 237a indicating the light incidence state may be used in a process of identifying the muting state. Therefore, there is no need for a separate external indicator indicating the muting state.

Figure 9A:
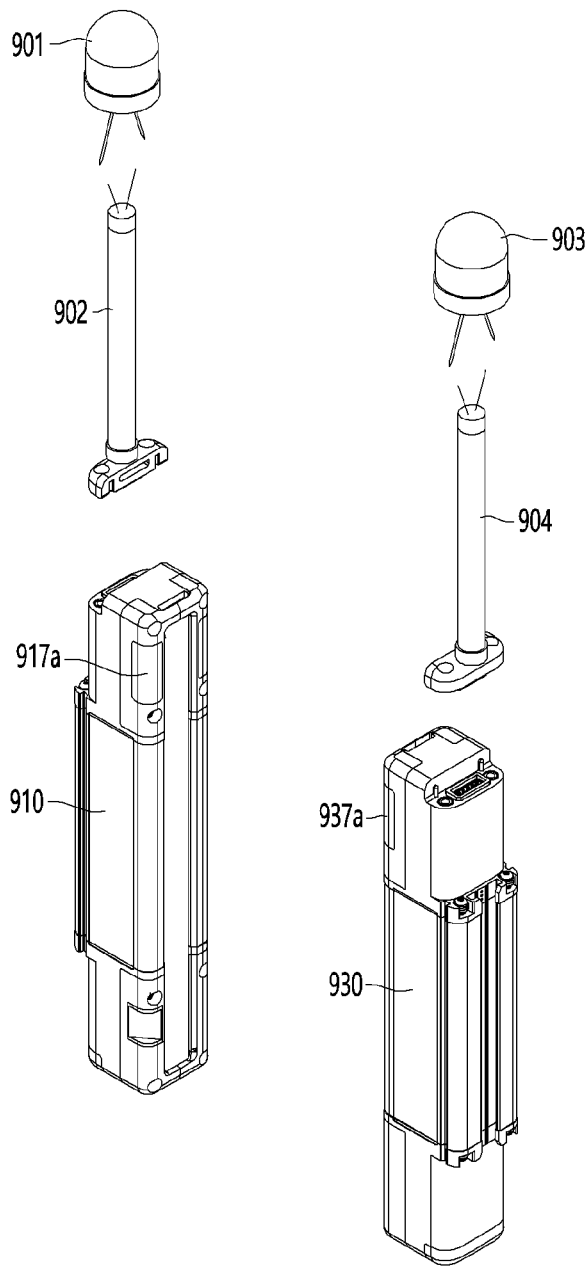
FIGS. 9a and 9b are views illustrating a configuration of a multi-optical axis sensor including a separate external indicator indicating a muting state according to the prior art.
Figure 9B:
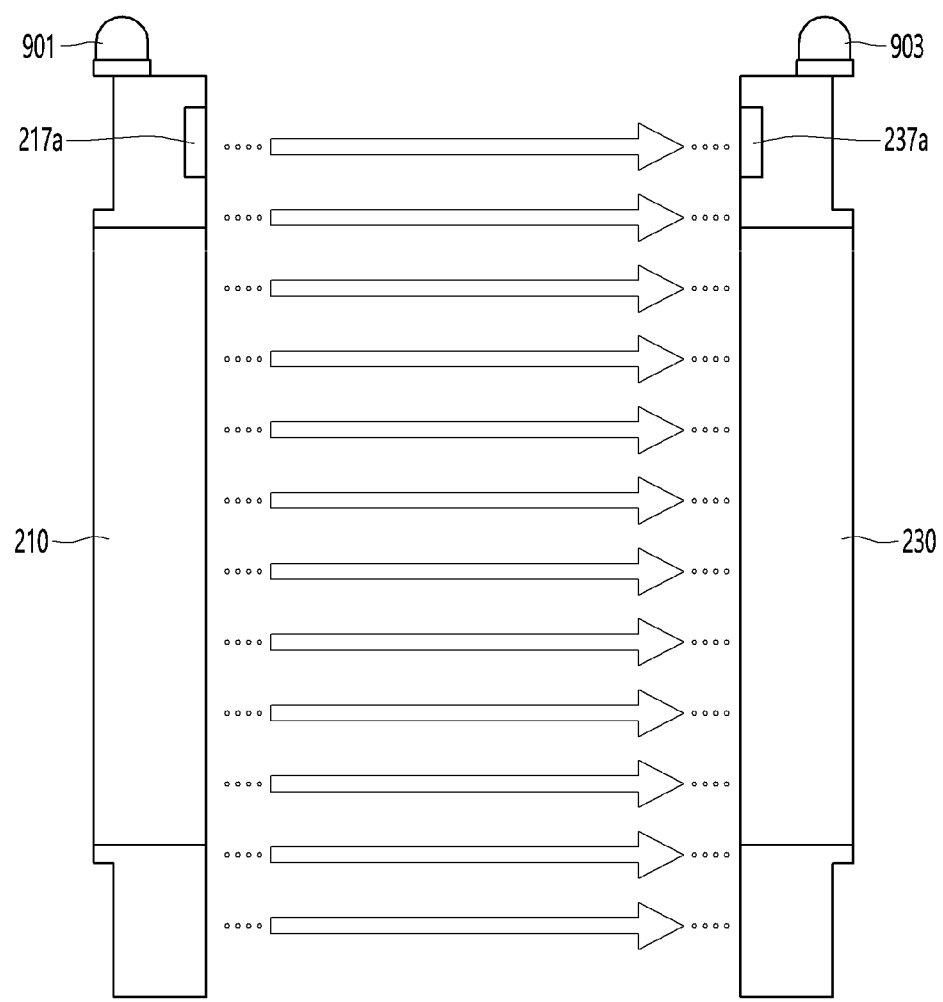

FIGS. 9a and 9b are views illustrating a configuration of a multi-optical axis sensor including a separate external indicator indicating a muting state according to the prior art, and FIG. 10 is a view illustrating an example of using an existing state indicator to indicate a muting state according to an embodiment of the present disclosure.

First, referring to FIGS. 9a and 9b, the light transmitter 910 of the conventional multi-optical axis sensor 900 may be provided with a first external indicator 901 and a wiring 902 for connection between the first external indicator 901 and the light transmitter 910.

A light receiver 930 may be provided with a second external indicator 903 and a wiring 904 for connection between the second external indicator 903 and the light receiver 930.

In addition, the light transmitter 910 may be provided with a first state indicator 917a indicating the light incidence/blockage state, and the light receiver 930 may be provided with a second state indicator 937a indicating the light incidence/blockage state.

Each of the first external indicator 901 and the second external indicator 903 may be turned on in a specific color to indicate the muting state when the multi-optical axis sensor 900 is in the muting state.

The multi-optical axis sensor 900 flickered in the specific color through the first external indicator 901 and the second external indicator 903 to notify the outside of the muting state when entering the muting state.

Referring to FIG. 10, the multi-optical axis sensor 200 according to the embodiment of the present disclosure may switch the operation mode of each of the first state indicator 217a and the second state indicator 217b from the light incidence/blockage mode to the muting mode, in the muting state.

That is, the multi-optical axis sensor 200 may control each of the first state indicator 217a and the second state indicator 217b to flicker in the specific color, when the operation mode of each of the first state indicator 217a and the second state indicator 217b is the muting mode.

That is, according to the embodiment of the present disclosure, unlike the prior art, the existing state indicator is used to indicate the muting state. Therefore, a separate external indicator and wiring are unnecessary and thus there is no space restriction.

In addition, since the external indicator and wiring are not used, cost may be reduced.

FIG. 11 is a table for comparing the prior art and the present disclosure for handling before and after detection of the muting state.

First, before the muting state is detected, the handling of the prior art is the same. That is, in the light incidence state, the state indicator is turned on in green (control output on). In the light blockage state, the state indicator is turned on in red (control output off).

After the muting state is detected, the prior art and the present disclosure shows a difference.

According to the prior art, after the muting state is detected, the external indicators 901 and 903 may flicker to indicate the muting state.

That is, the state indicators 917a and 937a may be used to indicate the light incidence state or the light blockage state as the original role thereof.

According to the present disclosure, after the muting state is detected, the operation modes of the state indicators 217a and 237a may be switched to the muting mode. Therefore, the state indicators 217a and 237a may be controlled to flicker in green to indicate the muting state.

As described above, according to the embodiment of the present disclosure, a separate external indicator indicating the muting state is unnecessary and thus space restrictions according to installation of the external indicator may be reduced. In addition, cost required to install the external indicator may be reduced.

Figure 12:
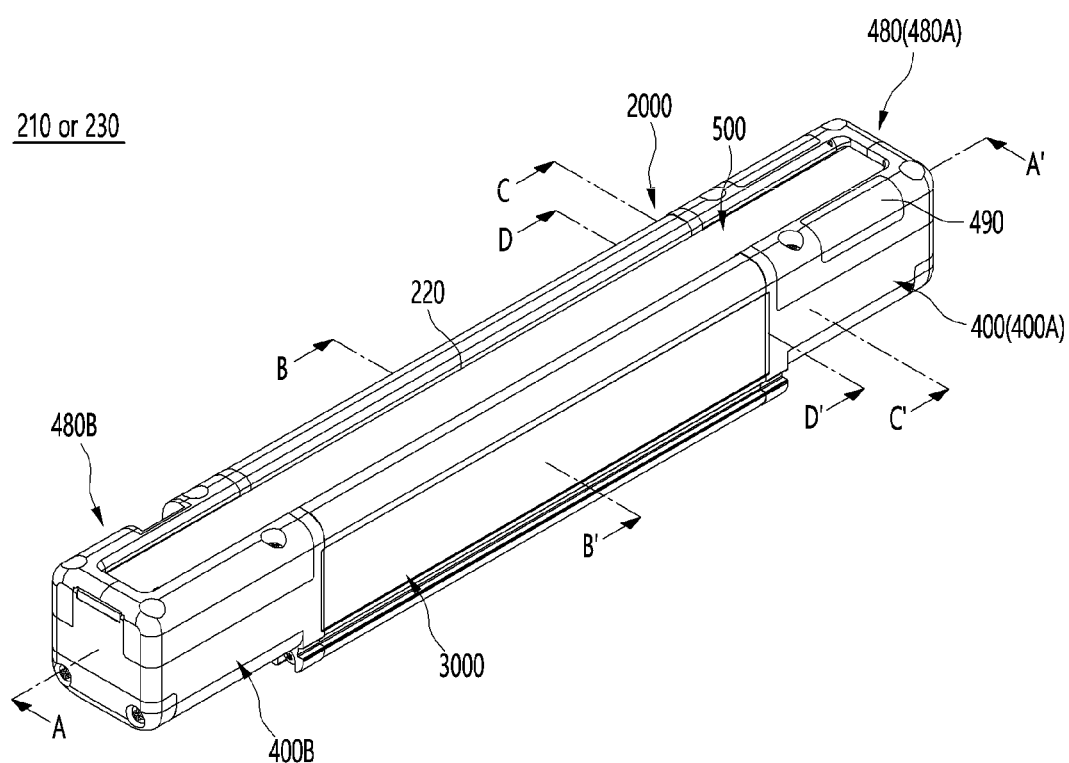
FIG. 12 is a perspective view of a light transmitter or a light receiver according to an embodiment of the present disclosure.

FIG. 12 is a perspective view of a light transmitter or a light receiver according to an embodiment of the present disclosure.

Hereinafter, the embodiment of FIG. 12 will be described assuming the light transmitter 210, but may be equally applied to the light receiver 230.

The light transmitter 210 according to the present embodiment may include a housing 2000.

The housing 2000 may form the appearance of the light transmitter 210.

The housing 2000 may have a bar shape elongated in approximately one direction.

The housing 2000 may include a main body 3000 and a pair of end caps 400 fastened to both ends of the main body 3000.

The main body 3000 may be formed to be elongated in the longitudinal direction of the housing 2000. The main body 3000 may be named as a profile.

The main body 3000 may have an internal space. In addition, both ends of the main body 3000 may be opened. The opened ends of the main body 3000 may be covered by the end caps 400.

The pair of end caps 400 may include one end cap 400A fastened to one end of the main body 3000 and the other end cap 400B fastened to the other end. Each end cap 400 may be formed to be elongated in the longitudinal direction of the housing 2000, similarly to the main body 3000.

The end cap 400 may have an internal space. In addition, between both ends of the end cap 400, the end on the side of the main body 3000 may be opened. Accordingly, when the end cap 400 is fastened to the main body 3000, the internal space of the end cap 400 and the internal space of the main body 3000 may communicate with each other.

In the longitudinal direction of the light transmitter 210, the length of the main body 3000 may be greater than that of the end cap 400. However, the present disclosure is not limited thereto and the length of the main body 3000 may be equal to that of the end cap 400 or may be less than that of the end cap 400.

An opening 220 may be formed in the housing 2000. The opening 220 may be formed to be elongated in the longitudinal direction of the housing 2000. The opening 220 may be formed in one surface (e.g., an upper surface) of the housing 2000. The opening 220 may be covered by a light transmission cover 500 described later.

A portion of the opening 220 may be formed in the main body 3000 and the other portion thereof may be formed in the pair of end caps 400.

The light transmitter 210 may include the light transmission cover 500.

The light transmission cover 500 may cover the opening 220 of the housing 2000. The light transmission cover 500 may transmit light. Accordingly, light may be emitted from the inside to the outside of the light transmitter 210 through the light transmission cover 500.

The light transmission cover 500 may have a horizontal panel shape. The light transmission cover 500 may be formed to be elongated in the longitudinal direction of the light transmitter 210.

The end cap 400 may be provided with end covers 480 restricting the light transmission cover 500. More specifically, a pair of end covers 480 may restrict both ends of the light transmission cover 500. For example, the pair of end covers 480 may restrict both ends of the light transmission cover 500 in a vertical direction.

By the end covers 480, a sealing structure between the light transmission cover 500 and the housing 2000 may be made more robust.

The end covers 480 may be fastened on the upper side of the end caps 400. A part of the end covers 480 may be located on the upper side of an end of the light transmission cover 500.

The pair of end covers 480 may include a first end cover 480A fastened to the upper side of one end cap 400A and a second end cover 480B fastened to the upper side of the other end cap 400B.

At least one of the pair of end covers 480 may be provided with one or more state display 490 for displaying the light incidence state or the light blockage state or detection information of the light transmitter 210.

The state display 490 may be another representation of the state indicator 217a or 237a of FIG. 2a.

Hereinafter, the case where the first end cover 480A is provided with the state display 490 will be described as an example.

The state display 490 may include a transparent or translucent material. In addition, a light source (e.g., LED) facing the state display 490 to emit light (visible light) may be installed in one end cap 400A. As another example, the light source may be provided on a main board of the light transmitter 210.

The light source may change the color of the light emitted through the state display 490 or flicker at predetermined intervals. Accordingly, an operator may easily recognize state information or detection information of the light transmitter 210 through the color or flicker of the light emitted through the state display 490.

Figure 13:
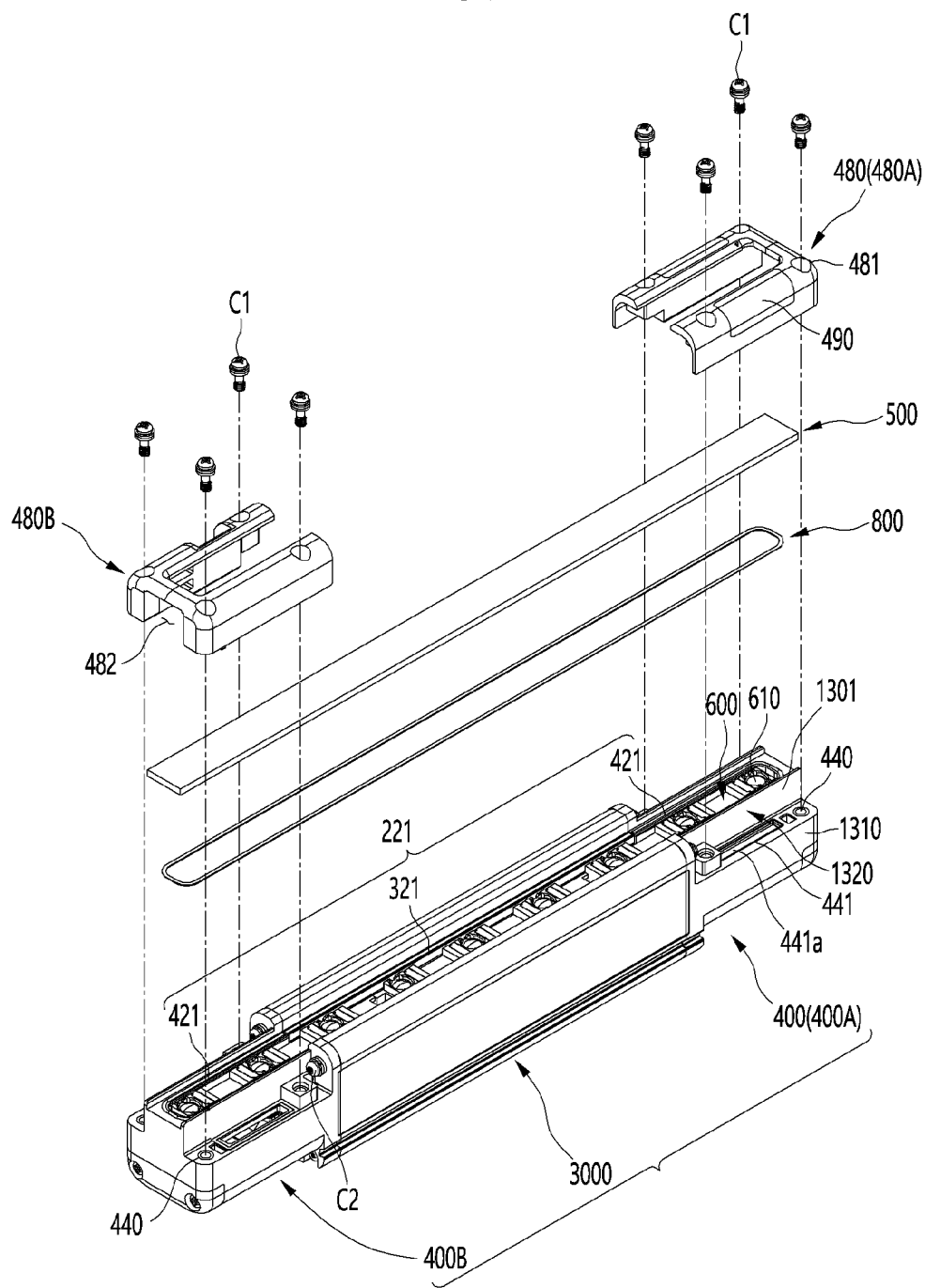
FIG. 13 is an exploded perspective view of a light transmitter or a light receiver according to an embodiment of the present disclosure.
Figure 14:
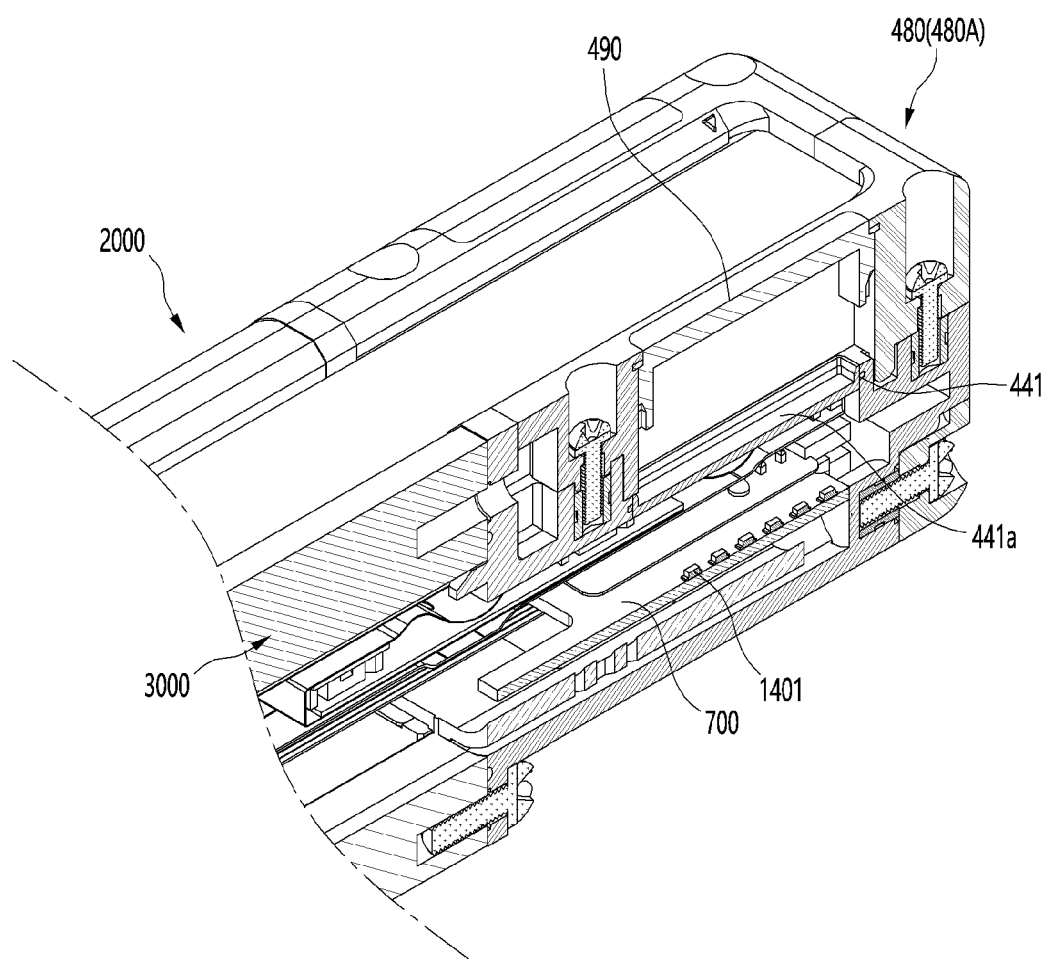
FIG. 14 is a view illustrating the inside when the components of the light transmitter or the light receiver are assembled.

FIG. 13 is an exploded perspective view of a light transmitter or a light receiver according to an embodiment of the present disclosure, and FIG. 14 is a view illustrating the inside when the components of the light transmitter or the light receiver are assembled.

Although the light transmitter 210 will be focused upon in FIGS. 13 and 14, the configuration of FIGS. 13 and 14 are applied to the light receiver 230 without change.

The light transmitter 210 according to the present embodiment may further include a cover sealing 800 for attaching the light transmission cover 500 to the housing 2000.

The cover sealing 800 may have a closed loop shape. The cover sealing 800 may be adhered to an edge of one surface (e.g., bottom) of the light transmission cover 500.

The cover sealing 800 may be formed by curing an adhesive for bonding the light transmission cover 500 and the housing 2000. More specifically, the cover sealing 800 may be a polyurethane adhesive.

Since the cover sealing 800 formed by curing the adhesive has elasticity, a gap between the housing 2000 and the light transmission cover 500 may be reliably sealed.

Accordingly, compared to the case where the cover sealing 800 includes an elastic material such as rubber or urethane, the light transmitter 210 may be compact and the light transmission cover 500 may be easily attached. In addition, compared to the attachment method using a double-sided tap, it has high sealing reliability even in various climatic environment conditions. In addition, since the adhesive is cured to form the cover sealing 800, it is possible to cover various types of light transmitter 210 having different lengths.

A sealing groove 221 in which the cover sealing 800 is disposed may be formed in the housing 2000. The cover sealing 800 may be located between a cover sealing groove 221 and the light transmission cover 500.

The cover sealing groove 221 may have a closed loop shape, similarly to the cover sealing 800.

The cover sealing groove 221 may have a first cover sealing groove 321 formed in the main body 3000 and a second cover sealing groove 421 formed in the pair of end caps 400. When the pair of end caps 400 is fastened to both ends of the main body 3000, the first cover sealing groove 321 and the second cover sealing groove 421 may be connected to form the cover sealing groove 221.

Meanwhile, the end covers 480 may be fastened to the end caps 400 in a state in which the light transmission cover 500 is attached to the housing 2000. The end covers 480 may have an approximately "E" shape.

A plurality of fastening members C1 (e.g., screws or bolts) may be fastened to fastening grooves 440 formed in the end caps 400 through fastening holes 481 formed in the end covers 480.

Avoidance grooves 482 for preventing interference with the light transmission cover 500 may be formed in the end covers 480. The end of the light transmission cover 500 may be disposed in the avoidance grooves 482. Accordingly, the end of the light transmission cover 500 may be restricted between the end caps 400 and the end covers 480.

A through-hole 441 covered by the end cover 480 may be formed in the end cap 400. The through-hole 441 may be a long hole shape in the longitudinal direction of the light transmitter 210.

The through-hole 441 of one end cap 400A may be formed at a position corresponding to the state display 490 provided in the first end cover 480A. Accordingly, the light source built in one end cap 400 may emit light to the state display 490 through the through-hole 441.

In addition, a transparent or translucent cap 441a may be fitted into the through-hole 441 of one end cap 400.

The light of the light source may be diffused through the cap 441a.

The through-hole 441 of the other end cap 400B may be formed at a position corresponding to an electrical part provided in the main board. The main board may be built in the housing 2000. Specifically, a part of the main board may be inside the main body 3000 and the other part thereof may be located inside the pair of end caps 400. The main board may include the light transmission controller 219 for controlling operation of the light transmitter 210.

A first part 1310 and second part 1320 of the end cap may be formed to be stepped. The second part 1320 may be disposed on the upper surface of the first part 1310 to protrude.

The second part 1320 may be disposed at a position higher than the first part 1310 by a predetermined height.

By a step formed between the first part 1310 and the second part 1320, the end cover 480 may have a E shape.

The end cover 480 may be coupled to the end cap 400.

A pair of blocking plates 1301 protruding by a predetermined height may be formed on the second part 1320 of the end cap 400. The blocking plate 1301 may be included in the second part 1320, but this is only an example and the blocking plate may be configured separately from the second part.

A light guide unit 600 may be disposed inside the pair of blocking plates 1301.

The blocking plate 1301 may block light emitted from the light transmission element. The protrusion height of the blocking plate 1301 may be greater than that of the light guide unit 600.

Through the blocking plate 1301, influence between the light transmission element provided in the light guide unit 600 and the light source provided on the main board 700 (see FIG. 14) may be minimized.

The first part 1310 and second part 1320 of the end cap 400 may be coupled to the end cover 480 to form an integrated structure.

For example, the electrical component may include at least one of a reflector, a connector or a control switch.

Accordingly, the second end cover 480B may be provided with a transparent or translucent display, and the reflector E1 provided on the main board 700 may display a flexible numeric display (FND) on the display through the through-hole 441. In addition, the operator may easily approach the connector E2 and/or the control switch E3 provided on the main board through the through-hole 441 by removing only the second end cover 480B.

The end cover 480 may cover a fastening end C2 for fastening the main body 3000 to the end cap 400. Therefore, the appearance of the light transmitter 210 may be neat.

The light transmitter 210 may include the light guide unit 600.

The light guide unit 600 may be located inside the housing 200. The light guide unit 600 may be located below the light transmission cover 500.

The light guide unit 600 may be formed to be elongated in the longitudinal direction of the light transmitter 210. A part of the light guide unit 600 may be located inside the main body 3000 and the other part thereof may be located inside the pair of end caps 400.

The light guide unit 600 of the light transmitter 210 may emit light to the outside of the light transmitter 210 through the light transmission cover 500. When the embodiment of FIG. 13 is applied to the light receiver 230, the light guide unit 600 may detect incident light through the light transmission cover 500.

A lens 610 of the light guide unit 600 may face the light transmission cover 500 through the opening 220 of the housing 200.

A plurality of lenses 610 may be provided. The plurality of lens 610 may be arranged in a line or a plurality of columns in the longitudinal direction of the light transmitter 210.

In the longitudinal direction of the light transmitter 210, the plurality of lens 610 may be spaced apart from each other by a certain pitch P.

Referring to FIG. 14, the plurality of light sources may be provided on the main board 700. Each of the plurality of light sources 1401 may be formed at a position corresponding to the through-hole 441. Each of the plurality of light sources 1401 may be an LED for emitting light having a specific color.

The through-hole 441 may be formed at a position corresponding to the state display 490 provided on the first end cover 480A. Accordingly, the light source built in one end cap 400 may emit light to the state display 490 through the through-hole 441.

The plurality of light sources 1401 may be disposed to be spaced apart from each other at a certain distance.

The plurality of light sources may emit light, and the emitted light may be emitted to the state display 490 through the through-hole 441.

The controller provided on the main board 700 may control the plurality of light sources to output a first color indicating the light incidence state.

The controller provided on the main board 700 may control the plurality of light sources to output a second color indicating the light blockage state.

A task manager may recognize the light incidence state or the light blockage state through the color of the light emitted through the state display 490.

The controller provided on the main board 700 may switch the operation mode of the plurality of light sources from the light incidence/blockage mode to the muting mode, when the muting state is detected, based on the muting signal.

The controller provided on the main board 700 may control the plurality of light sources such that the green color flickers at a period of 1 second, when the muting state is detected.

The task manager may recognize the muting state through light emitted through the state display 490.

According to an embodiment of the present disclosure, the above-described method can be implemented as a processor-readable code on a medium in which a program is recorded. Examples of the processor-readable medium include ROM, RAM, CD-ROM, magnetic tape, floppy disk, and optical data storage device.

In the multi-axis sensor described above, the configuration and method of the above-described embodiments are not limitedly applicable, but all or part of each embodiment is selectively configured in combination so that various modifications can be made.

The invention claimed is:

1. A multi-optical axis sensor comprising:
a light transmitter including a plurality of light transmission elements; and
a light receiver including a plurality of light reception elements disposed to respectively face the plurality of light transmission elements and configured to receive light,
wherein the light transmitter or the light receiver comprises:
a housing provided with an internal accommodation space, the housing including:
a main body having opened ends:
a pair of end caps including:
one end cap fastened to one end of the main body; and
an other end cap fastened to an other end of the main body; and
a pair of end covers fastened to the pair of end caps, the pair of end covers including:
a first end cover fastened to an upper side of the one end cap; and
a second end cover fastened to an upper side of the other end cap;
a light guide unit spanning the main body and the pair of end caps and including the plurality of light transmission elements or the plurality of light reception elements; and
a plurality of light sources provided inside the one end cap and configured to output light indicating a light incidence state, a light blockage state and a muting state.

2. The multi-optical axis sensor of claim 1, wherein each of the one end cap and the other end cap comprises a first part and a second part, the second part being formed to be stepped from the first part and protruding from the first part.

3. The multi-optical axis sensor of claim 2, wherein a pair of blocking plates protruding from the first part by a predetermined height is formed on the second part of the one end cap to minimize influence between light emitted from the plurality of light transmission elements or light received by the plurality of light reception elements and light output from the plurality of light sources.

4. The multi-optical axis sensor of claim 3, wherein a protrusion height of the blocking plate is greater than that of the light guide unit.

5. The multi-optical axis sensor of claim 1, wherein a through-hole covered by the first end cover is formed in the one end cap.

6. The multi-optical axis sensor of claim 5, wherein a transparent or translucent cap is fitted into the through-hole.

7. The multi-optical axis sensor of claim 1, wherein the light transmitter or the light receiver further comprises a light transmission cover or a light reception cover covering an opening formed to be elongated in a longitudinal direction of the housing, and
wherein the pair of end covers restricts both ends of the light transmission cover or the light reception cover.

8. The multi-optical axis sensor of claim 1, wherein the first end cover comprises a state display for outputting light by the plurality of light sources.

9. The multi-optical axis sensor of claim 8, wherein the second end cover is provided with a flexible numeric display (FND).

10. The multi-optical axis sensor of claim 1, wherein the plurality of light sources are configured to:
output a first notification indicating the light incidence state, when the light incidence state is detected in a light incidence/blockage mode,
output a second notification indicating the light blockage state, when the light blockage state is detected in the light incidence/blockage mode, and
switch the light incidence/blockage mode to a muting mode and outputs a third notification indicating the muting state, when a muting state that invalidates a safety function of the multi-optical axis sensor is detected.

11. The multi-optical axis sensor of claim 10, wherein the first notification is a notification in which the plurality of light sources outputs a first color,
wherein the second notification is a notification in which the plurality of light sources outputs a second color, and
wherein the third notification is a notification in which the plurality of light sources outputs a third color.

12. The multi-optical axis sensor of claim 11, wherein the first notification is a notification in which the first color is continuously output in the light incidence state,
wherein the second notification is a notification in which the second color is continuously output in the light blockage state,
wherein the third notification is a notification in which the third color flickers in the muting state, and
wherein the first color and the third color are the same.

13. The multi-optical axis sensor of claim 1, wherein the light transmitter or the light receiver switches an operation mode of the plurality of light sources from a muting mode back to a light incidence/blockage mode, when detecting that the muting state is finished.

14. The multi-optical axis sensor of claim 1, wherein the light transmitter or the light receiver determines that the muting state is detected, when an on signal is received from a first muting sensor and then an on signal is received from a second muting sensor in which an order of input with the first muting sensor is predetermined.

15. The multi-optical axis sensor of claim 14, wherein the light transmitter or the light receiver determines that the muting state is finished, when an off signal is received from the first muting sensor.

16. A multi-optical axis sensor comprising:
a light transmitter including a plurality of light transmission elements; and
a light receiver including a plurality of light reception elements disposed to respectively face the plurality of light transmission elements and configured to receive light,
wherein the light transmitter or the light receiver comprises:
a housing provided with an internal accommodation space, the housing including:
a main body having an opened upper end and an opened lower end;
a pair of end caps including:
one end cap fastened to the upper end of the main body; and
an other end cap fastened to the lower end of the main body; and
a pair of end covers fastened to the pair of end caps, the pair of end covers including:
a first end cover fastened to an upper side of the one end cap; and
a second end cover fastened to an upper side of the other end cap;
a light guide unit spanning the main body and the pair of end caps and including the plurality of light transmission elements or the plurality of light reception elements; and
a plurality of light sources provided inside the one end cap and configured to output light indicating a light incidence state, a light blockage state and a muting state,
wherein the plurality of light sources are respectively disposed at both side edges of the upper side of the one end cap,
wherein the first end cover comprises a state display configured to output light emitted from the plurality of light sources, and
wherein the state display is respectively provided at positions where an upper surface of the first end cover and both side surfaces of the first end cover meet each other, such that the light from the plurality of light sources is emitted through the state display.

* * * * *